UNITED STATES PATENT OFFICE.

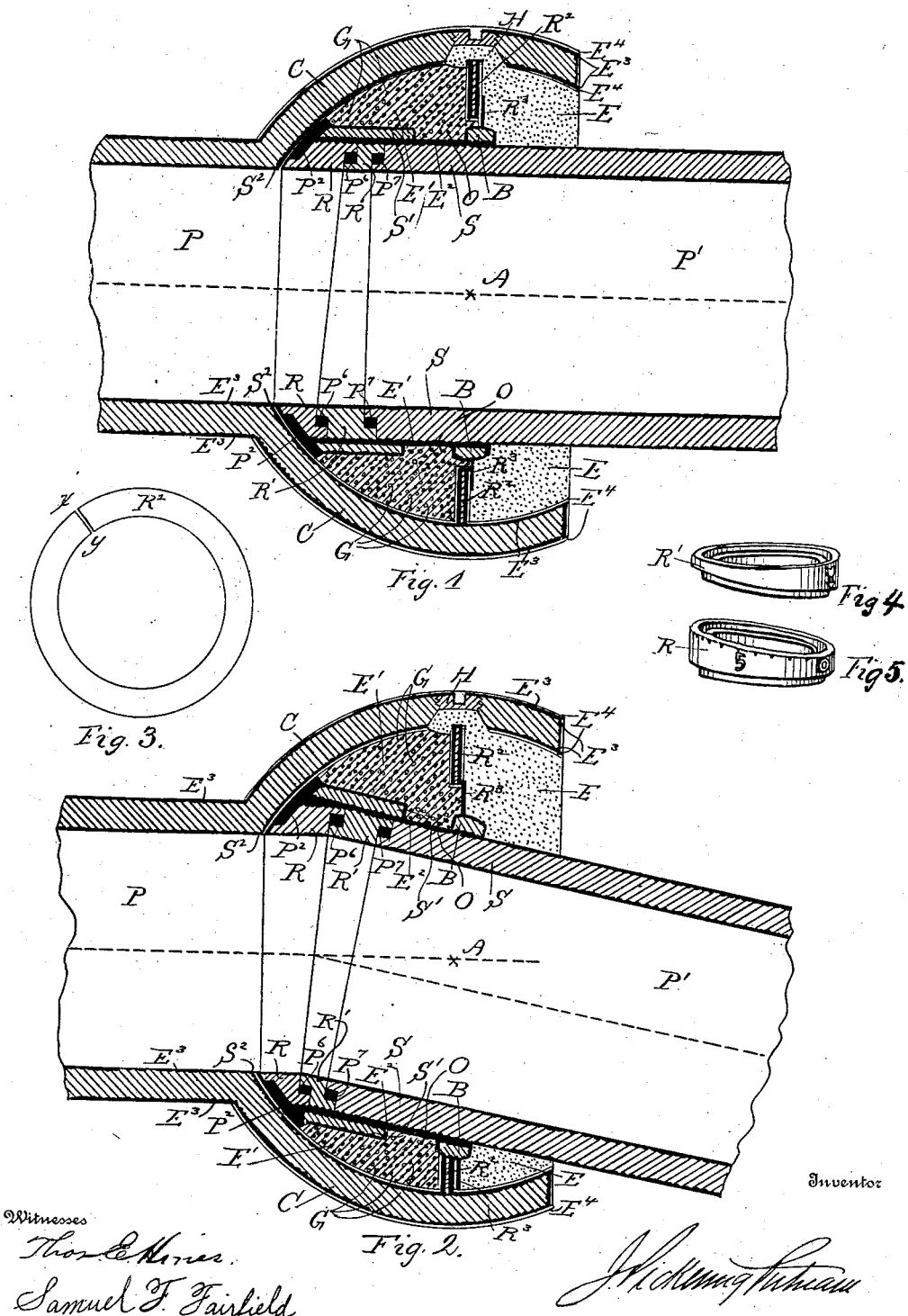

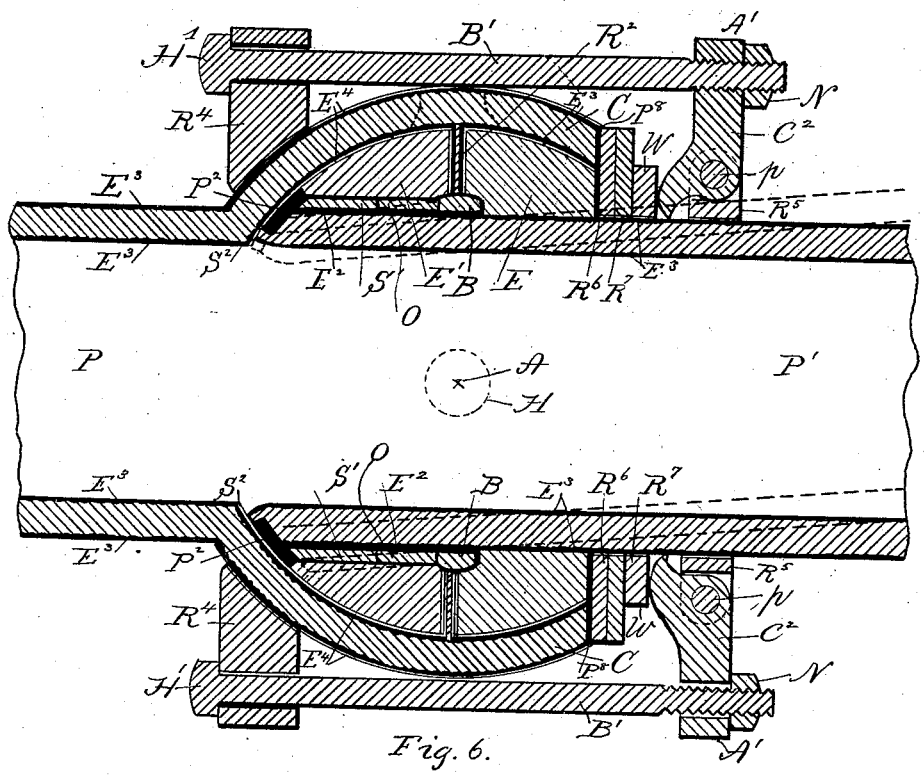
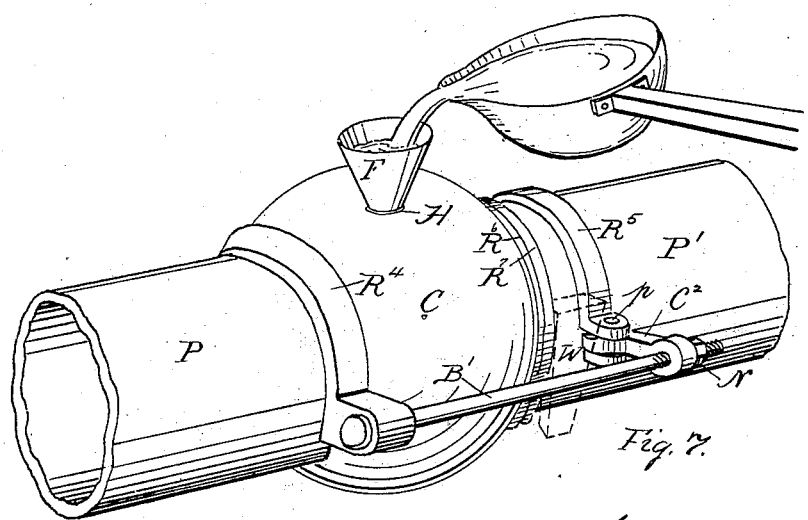

JOHN PICKERING PUTNAM, OF BOSTON, MASSACHUSETTS.

PIPE-JOINT.

No. 857,905.  Specification of Letters Patent.  Patented June 25, 1907.

Application filed May 2, 1904. Serial No. 205,959.

*To all whom it may concern:*

Be it known that I, JOHN PICKERING PUTNAM, of Boston, in the county of Suffolk and State of Massachusetts, have invented certain new and useful Improvements in Pipe-Joints, of which the following is a specification.

The object of my invention is to provide a flexible joint for gas, water, plumbing and other piping which shall be permanently tight under pressure, and which shall enable lengths of piping not only to move or expand and contract longitudinally and laterally, but also to be set at an angle with one another and to rotate, without affecting the tightness of the joint. I attain these results by the mechanism illustrated in the accompanying drawings in which:

Figures 1 and 2 are longitudinal sections of the device showing the ends of two pipes connected by my joint, the first representing the pipes set in alinement, and the second showing them set at an angle one with the other. Fig. 6 is a longitudinal section of a modification of the joint and of the mechanism used to hold the ends of the two pipes together while the binding materials forming the joint are setting. Fig. 7 is a perspective view of the same, showing the method by which the binding materials are inserted; and Figs. 3, 4 and 5 are details of construction. Figs. 1, 2 and 6 are drawn to the same scale, and Figs. 3, 4, 5, and 7 are drawn to a scale half that of Figs. 1, 2 and 6.

Similar letters refer to similar parts throughout the several views.

C is the cup shaped end of one of the pipes P connected by my joint, and S is the spigot end of the other pipe P'. The cup is spherical in shape the diameter of the sphere being greater than that of the pipe P. The mouth, or opening of the cup is a little larger than the exterior diameter of the spigot end of the pipe P', so as to receive the same, and also leave room for considerable lateral play when the pipe P' is rotated around the point A as an axis. The point A is at the center of the cup C, and when the spigot S is in its proper place in the cup to make the joint, it forms the center of rotation of the pipe P'.

In order to permit of the rotation of the pipe P' around the point A as an axis smoothly, the spigot end of this pipe is provided with an exterior enlargement E of spherical shape on the outer surface, and of size corresponding with, and fitting into, the spherical cup C of the pipe P; and in order to obviate the difficulty of the spherical spigot sticking in the cup through corrosion, as well as to provide an economical form of construction, I construct the spigot enlargement of Portland or similar hard cement, and provide the interior surface of the cup C with a lining $E^3$ of asphaltum coal tar pitch, or other suitable protecting material softer than the material of which the pipes are made, and softer than the hard cement enlargement of the spigot. Where the pipes to be jointed are made of iron I prefer to make the lining $E^3$ of asphaltum because this material not only protects the pipes but also fills up the irregularities of surface of the iron, and leaves a smooth surface spherical in the cup, into which the Portland cement flows and forms a true sphere. The asphaltum also, being softer than the Portland cement after the latter has set, yields when the sphere of cement rotates within the cup, in such places as are not of perfectly true spherical form, thereby permitting the pipes to rotate at the joint in case of shrinkage or settlement of the surfaces upon which the pipes rest. To this end it is only necessary to provide that the thickness of the lining $E^3$ of asphaltum shall be sufficient to cover the irregularities of surface of the pipe castings whether these irregularities consist in roughness of surface or imperfections of general contour which cause a deviation from a perfectly spherical form.

For the purpose of still further facilitating the rotation of one sphere against the other, I lubricate the inner surface of the lining $E^3$ preferably by dipping it in melted paraffin, $E^4$, which constitutes a further precaution against the sphere of cement E sticking to the cup, when the cement is poured in between the spigot and cup to form this spherical enlargement E, and at the same time it forms an enduring lubricator for the joint. This paraffin lining $E^4$ is particularly useful where the joint is used for connecting cast iron gas mains where but little pressure is exerted on the joints from within.

In order to render the joint still more secure against leakage even under very great pressure from within, I use between the spigot and cup not only the ring of hard cement E surrounding the spigot and extending from the mouth of the cup inward toward the base of the cup, but also a ring of soft bituminous cement E' surrounding the spigot and extending from the point where the hard cement terminates, to the shoulder $S^2$, or point where the cup connects with the pipe P. I prefer to use for this soft cement $E'$ a mixture of asphaltum with petroleum to render it permanently pliable, and where the mixture is to be used in plumbing pipes or other places where it is liable to be subjected to considerable heat, I add to the mixture whiting, lime or other suitable powder having a higher melting point than that of the soft cement $E'$ to prevent its becoming too fluid when heated. As a further preventive of its escape when heated I add to the mixture, in certain cases, suitable granular substances having grains G larger than the spaces formed between the hard materials constituting the joint due to the roughness and imperfections of the castings.

To permit of the easy introduction of the hard and soft cements into the joint, I cast a hole H through the side of the cup, preferably in the plane of its largest diameter, through which the cements may be poured in their fluid state as shown in the perspective view Fig. 7, the soft bituminous cement being made fluid by the application of heat, and the Portland cement by mixing with water. To keep the two cements apart in the joint, I construct within the space between the cup and spigot a partition made of the ring $R^2$ or of the two rings $R^2$ and $R^3$. A single ring $R^2$ suffices when the amount of rotation of the pipe $P'$ around the point A is intended to be slight, and two rings $R^2$ and $R^3$ are required in joints in which this rotation is intended to be quite considerable. In the former case the ring $R^2$ is of such dimensions that its outer circumference shall bear against the inner surface of the cup C, and its central opening shall be just sufficient to embrace the spigot S or its sleeve $S'$ or the bead B thereon. In the latter case the central opening in $R^2$ is larger allowing greater movement of the pipe $P'$ and ring $R^3$ fits the spigot and laps over the opening in ring $R^2$, the two rings forming together a barrier to the passage of the cements when poured into the joint in the fluid state.

I prefer to construct ring $R^2$ of sheet iron and ring $R^3$ of stiff tar paper. The reason for constructing the ring $R^2$ of a strong substance like sheet metal is to enable it to afford a resistance to the escape of the soft cement $E'$ under pressure from the interior of the pipes P $P'$ before the Portland cement E has set and become hard. This happens when it is desired to repair water mains quickly or insert new piping which must be put to use quickly after laying and before the Portland cement has had time to harden and form a key to retain the soft cement. While the Portland cement is hardening, the metal ring $R^2$ has to perform the office of the key and to this end I place it in the cup at the point of its largest diameter so that when the pressure from within the pipes bears upon it this pressure only serves to force it more firmly against the interior surface of the cup as its size diminishes in receding from the plane of its greatest circumference where the ring disk is placed. To permit of this metallic ring $R^2$ being inserted in the cup in this position I construct it as shown in Fig. 3 cut across from $x$ to $y$ so that it can be bent into the form of a spiral and inserted into the cup as a cork screw would be inserted. I insert this ring into the cup before the pipe is coated with its protecting coat of asphaltum or coal tar pitch $E^3$. The coating $E^3$ then covers not only all parts of the pipe and its cup C, but also the ring $R^2$ on both sides and serves to bind the ring securely to the inner surface of the cup, which not only adds to its power of resisting pressure, but also holds it firmly in position while the spigot S is being introduced through the hole in the ring. The coating furthermore makes a tight partition of the ring $R^2$ when the cements are poured into the joint.

In order to render the joint more secure, and to prevent the cements which are used for forming the enlargements E and $E'$ from running out when they are introduced in a liquid state, I place a flexible ring or packing $P^2$ between the spigot end of the pipe $P'$ and the lower part of the cup C at the shoulder $S^2$. This packing also prevents the asphaltum from running out when the joint is heated in use by boiling water running through the pipe system as might happen in house plumbing service. As a further precaution against the asphaltum running out when highly heated as in plumbing service, I insert a loose sleeve $S'$ around the spigot S. This sleeve hugs the spigot closely and rests upon the packing $P^2$ at one end and at the other enters the hard cement ring E. Should the pipe $P^1$ at any time draw away through shrinkage in cooling from the pipe P, or through any other cause, the end of the spigot S and the shoulder $S^2$ at the base of the cup C, draw away from each other, the packing $P^2$ still remains compressed by the sleeve $S'$, and any escape of asphaltum from the joint is thus prevented. The space between the sleeve $S'$ and the spigot S is filled with soft cement or asphaltum $E^2$. This filling being softer and more elastic than the material of which the pipes are made, permits of the longitudinal play of the spigot in the joint due to expansion and contraction of the pipes P and $P'$ without injury to the latter or to the tightness of the joint under pressure.

The top of the sleeve, where it bears against the hard cement E is provided with a bead B the outer surface of this bead having the form of a portion of a sphere whose center is at A the center of the sphere of the cup C. In virtue of this form of the bead B and of its being situated in line with the center of rotation A the spigot S can be rotated about this point A in setting the pipes before pouring in the cements without opening a space between the ring R² and the bead B, when the form of joint shown in Fig. 6 is used. I also perforate the sleeve S' with openings O all around near its top and below bead B, to allow elastic cement E' to come against the spigot S to insure tightness when the spigot end moves by expansion and contraction.

The Portland cement ring E may be applied to the joint with a knife or trowel when it is in a plastic state through the space between the mouth of the cup and the surface of the spigot. Or it may be inserted in a liquid state by pouring it through the hole H in which case this hole is placed centrally over the edge of the ring disk, as shown in Figs. 1, 2 and 6. In this case a funnel is used to facilitate the introduction of the cement, the Portland cement being guided by the funnel to one side of the ring disk and the soft cement to the other side.

If the Portland cement is applied in a liquid state it is necessary that the annular opening of the cup C around the spigot S should be temporarily closed in order to prevent the liquid cement from running out of the mouth of the cup as fast as it is poured in. To provide for this closing of the mouth I cover the mouth with a disk of felt or tar paper surrounding the spigot and fitting it tightly. I then press this disk against the mouth of the cup by a mechanism which I will now describe.

After the spigot S of the pipe P' has been inserted into the cup C of the pipe P, and the packing P² has been brought to bear on the shoulder S² at the junction of the cup C with the pipe P, the end of the spigot should press this packing firmly against the shoulder in order to insure against any possible escape of the liquid cement into the bore of the pipe. I provide this pressure by means of the cams C² C² one on each side of the pipe P'. The cams are pivoted at $p$ to the ends of the half ring R⁵ which straddles the pipe P' beyond the mouth of the cup C. The cams are actuated by the bolts B' B' which pass through the ends of the long arm of the cam levers at A' A', and through a second half ring R⁴ which straddles the pipe P at the point where it enlarges into the cup C. The bolts pass through holes in the ends of this half ring R⁴. The actual pressure is supplied by screwing the nuts N. N. on the threaded ends of the bolts, against the long arms of the lever, the bolts being held at their opposite ends by the bolt heads H' H'. Under this pressure the short arm of the cam lever which is sharpened at its end into the form of a beak or talon is forced against the sides of the pipe P' firmly gripping the pipe P' and forcing the end of the spigot S against the packing P² as required.

The packing P⁸ which closes the mouth of the cup C is held in place by the split ring R⁶ R⁷ which in its turn is forced against the packing P⁸ by the wedges W W, one on each side of the pipe P', and bearing against the pivot ends of the half ring R⁵.

The pour hole H is equidistant between the bolts B' B' when the parts are in place ready for pouring in the cement, and the hole is in the upper side of the pipe cup. Inasmuch as hard cements, like Portland cement, require several weeks or even months to obtain proper hardness to permit of the safe removal of the mechanism described, this mechanism becomes an essential part of the joint for a considerable period of time, and may even be retained in special cases for a year or more before any serious settlement in the street or structure in which the joint is made is to be feared, whereby the rotation of the joint is required.

The end of the spigot S has a slight flare or trumpet shape as shown in Fig. 6 so that when the pipe is rotated the continuity of the pipe bore is not interrupted so sharply as would be the case were the end of the spigot cut off square.

When it is desired that the pipes P and P' shall be set at a considerable angle one with the other as shown in Fig. 2 and yet preserve a continuous and unbroken interior surface of the piping, I make use of the rings R and R', Figs. 2, 4 and 5, set within the cup C, the internal diameter of the rings being the same as that of the pipes P and P'. The lower edge of the ring R bears against the shoulder S². The upper edge of this ring, however, is pitched at an angle with its axis, the angle being one half of the angle of greatest possible inclination of the pipes to each other. The lower edge of the ring R' is also pitched at this same angle with its axis, while its upper edge is at right angles with its axis like the lower edge of the ring R. When now it is desired to set the two pipes P and P' in straight alinement so that the axis of one shall be a continuation of that of the other in the same direction, the ring R' is placed upon the ring R in such a position that the two inclined edges shall exactly offset each other, or, in other words, that the longest side of the ring R' shall come over the shortest side of the ring R, making the arrangement shown in Fig. 1. When, on the other hand, it is desired that the pipes P and P' shall be set at the greatest possible angle with each other, the relative arrangement of the rings R and R' is exactly the reverse, i. e. the longest side of the ring R' is brought in contact with the longest side of the ring R, and we have the disposition shown in Fig. 2. An intermediate arrangement of the rings will produce an angle in the pipe alinement intermediate between these two.

In order to facilitate the setting of the pipes in the exact angle desired, figures are cast on one of the rings as on the ring R, Fig. 5, which denote the exact number of degrees the pipe P' will slope beyond the straight line, when the small index or arrow cast on the other ring, say the ring R', is placed over that particular figure. Thus if the ring R' is placed upon the ring R in such a position that the arrow comes over the sign 0, the axis of the two pipes will form no angle with each other, and the pipes will be in straight alinement. If the arrow comes over the sign 5, the pipes will incline with each other at an angle of 5 degrees. I prefer to designate single degrees between 0° and 5° and between 5° and 10° by simple notches on the upper edge of the ring as shown in Fig. 5, and by these figures and signs it is easy to give an accurate pitch to the pipes P and P' to any known degree or parts of a degree. To insure the rings and pipes fitting accurately upon one another in respect to their inner surfaces, I prefer to construct their edges with recesses or small cups and spigots as shown in the Figs. 1, 2, 4 and 5, and in these recesses to insert small packing rings $P^6$ and $P^7$, which not only insure accurate setting but also serve as barriers to the escape of the liquid cement when it is poured into the joint in making it up. Where a simpler construction is desired I omit the ring R', and form the end of the spigot with an inclination to take the place of that of the ring R'. The same variation of alinement may then be obtained as has been described in the use of the two rings R and R'. It is seen that by this method of jointing gradual bends may be produced without interior recesses or sharp angles.

After the cement has been poured into the joint through the hole H and has set and attained its proper degree of hardness, I plug up the hole H with Portland cement which, after hardening, cannot be forced out because of the fact that the hole is of larger diameter on the interior side of the cup than on the exterior side. When, however, a joint is to be used directly after setting, I plug up the hole H with a threaded iron plug having its interior surface formed to make a continuation of the interior surface of the cup.

When the joint has been completed by the proper hardening of the cement, this joint becomes an effective ball and socket joint. The lining $E^3$ or the linings $E^3$ and $E^4$, being softer than the cement E and much softer than the material of which the pipes are made, yield when these pipes are rotated about the point A, as would be occasioned by the shrinkage or settlement of the supports on which the pipes rest, and permit of this rotation without fracturing the materials of the pipes and jointing and without causing a leak even under high pressure from within the pipes.

The ring of hard cement E forms a key to resist the effort of the soft cement E' to escape through the mouth of the cup under heavy pressure from within the pipes. The only effect of an increase of such pressure would be to cause this key E to press harder against the contracting surfaces of the cup C as they approach its mouth, and correspondingly compress the coatings $E^3$ and $E^4$. The tenacious and ductile bituminous cement E' is, under heavy pressure, only forced more powerfully against and into the pores of the hard cement E making the joint all the tighter on account of this increased pressure.

I have designated my mechanism as a "pipe joint," but I do not wish to disclaim, because of the use of this term, the application of my device for coupling together any other two articles in which the use of this special mechanism or combination of parts may be convenient. For instance two pipes so jointed might have their free ends closed in such a way that one would constitute a jar or box, and the other its cover, and my invention would be as applicable to such a use as if the device were used on ordinary pipes alone. In such a case the mouth or neck of the box or bottle so connected with another vessel or its cover becomes in effect, a short pipe, and this holds as well with reference to the cover as to the box itself, so that in my claims I use, for convenience, the term "pipes" to cover any vessels connected in the manner covered by my invention whether the free ends are open or closed.

I do not confine myself to Portland or other hard cement for the enlargement E. Any hard material which can be applied around the spigot to fill the space between it and the cup will suffice, but I prefer cement as easiest to apply.

I am aware that before my invention pipe connections have been made on the ball and socket principle, in which both parts of the joint have been cast in cement independently in molds so as to form parts of a smooth and perfect sphere, and that a lubricator has been used between these two true molded surfaces, when they are brought together to form the joint. But I am not aware and do not believe that heretofore ordinary rough castings, as of common foundry iron, have been given the effect of machine turned joints by coating the surface of one of them with a soft material thick enough to cover up all the imperfections and constitute a mold or matrix, and then casting between it and the other pipe at the time of making the joint, a hard cement filling which shall mold itself upon the soft coating as in a matrix. The joint thus becomes the equivalent of one made perfectly true by machine turning, because the soft material, after having first served as a matrix or mold for the formation of the cement, afterward is able, in virtue of its thickness, to yield at any place sufficiently to still further facilitate the rotation of one part of the joint upon the other. It thus entirely differs from any hitherto made of which I am aware, in that my soft material forms at one and the same time a mold for casting the cement in sites, and a yielding lubricator in which the cast cement can revolve when it becomes hard.

Claims.

1. In a pipe joint consisting of a cylindrical shaped spigot on the end of one pipe, inserted within a cup shaped enlargement on the end of another pipe, the cup having a spherical inner surface, the combination with the spigot and cup of a soft cement lining on the inner surface of the cup and on the outer surface of the spigot, and of a hard cement filling between the two.

2. In a pipe joint consisting of a spigot on the end of one pipe inserted within a cupped end of another pipe, the combination with the spigot and cup of a ring between the two, a space between the ring and the spigot and a soft material filling this space.

3. In a pipe joint consisting of a spigot on the end of one pipe inserted within a cupped end of another pipe, the combination with the spigot and cup of two rings inserted between them the outer ring being of hard cement and the inner ring of soft cement.

4. In a pipe joint consisting of a spigot on the end of one pipe inserted within a cupped end of another pipe, the combination with the spigot and cup of two cement rings inserted between them, one ring surrounding the spigot at its end and filling the bottom of the cup, and the other ring surrounding the spigot below its end and filling the top or mouth end of the cup, the former being a soft ring and the latter a hard ring.

5. In a pipe joint consisting of a spigot on the end of one pipe inserted within a cupped end of another pipe, the combination with the spigot and cup of two cement rings inserted between them, one ring being of hard cement filling the outer part of the space between the cup and the spigot, and the other ring being of soft cement, adhesive and flexible, filling the inner part of the space between the cup and the spigot, and a soft adhesive and flexible lining between the hard cement ring and the surface of the pipes.

6. In a pipe joint consisting of a spigot on the end of one pipe inserted within a cupped end of another pipe the interior of the cup being spherical, the combination with the spigot and cup of a hard ring between the two, the outer surface of the ring being spherical and the inner surface cylindrical, and a soft adhesive and flexible material between the ring and the pipes 7. In a pipe joint consisting of a spigot on the end of one pipe inserted within a cup-shaped enlargement on the end of another pipe, the combination of the spigot having its outer surface approximately cylindrical, and the cup having its inner surface approximately spherical in shape, but both having the roughness of surface and minor imperfections of contour usual with ordinary rough castings as of iron before it has been trued up by machine work, and a soft material forming a matrix or mold on one of the castings, and a cement ring cast in the mold between it and the other casting, the mold being of a thickness sufficient to cover all the imperfections of the rough surface of the casting.

8. In a pipe joint the combination with a spigot ended pipe section, of another pipe section having at its end a cupped enlargement into which the spigot is inserted; a ring within the cup having its lower edge resting on the lower inside surface of the cup at its junction with the pipe, and its upper edge inclining at an angle with the central axis of the ring; and the spigot having its outer rim inclined at a similar angle.

9. In a pipe joint consisting of a spigot end of one pipe inserted into the cupped enlargement of another pipe, the combination with the spigot and cup of a ring between the two the ring having its upper end inclined at an angle with its axis and having index marks around its end.

10. In a pipe joint consisting of a spigot end of one pipe inserted into the cupped enlargement of another pipe, the combination with the spigot and cup of a ring between the two, the ring having its upper end inclined at an angle with its axis, and having degree marks around its circumference, and the spigot end of the pipe which is similarly inclined and has an index mark.

11. In a pipe joint consisting of a spigot end of one pipe inserted into the cupped enlargement of another pipe, the combination with the spigot and cup, of two rings between the two, the lower ring resting upon the interior surface of the cup at the point of its connection with its pipe, and having its upper surface inclined at an angle with its axis, and the upper ring having its lower surface inclined at a similar angle and resting upon the inclined surface of the lower ring: the upper ring having its other surface cut at a right angle with its axis, and supporting the end of the spigot.

12. In a pipe joint consisting of a spigot end of one pipe inserted into the cupped enlargement of another pipe, the combination with the spigot and cup, of two rings having an interior diameter corresponding with that of the pipes and placed between the spigot and bell, the rings having one end each inclined at an angle with its axis and having degree and index marks upon their outer surfaces.

13. The combination of the spigot S of the pipe P' placed within the cup C of the pipe P, rings R and R' between the end of the spigot and the base of the cup and the edges of the rings formed to interlock with each other so that their inner surfaces shall form an accurate alinement with the inner surfaces of the pipes P and P'.

14. In a pipe joint the combination with a spigot ended pipe section, of another pipe section having at its end a spherical shaped cup into which the spigot is inserted; a ring having an outer circumference substantially equal to the interior circumference of the cup at its point of greatest diameter, and an inner opening slightly larger than the spigot in cross section, and a cement filling between the spigot, ring, and cup.

15. In a pipe joint the combination with a spigot ended pipe section, of another pipe section having at its end a spherical shaped cup into which the spigot is inserted; a sheet metal ring surrounding the spigot, and having its outer circumference fitting against the largest part of the sphere, the ring being cut across its width; and a cement filling between the spigot and the bell cup.

16. In a pipe joint the combination with a spigot ended pipe section, of another pipe section having at its end a spherical shaped cup into which the spigot is inserted; a loose ring between the cup and the spigot; and a cement filling between the cup, spigot and ring.

17. In a pipe joint the combination with a spigot ended pipe section, of another pipe section having at its end a spherical shaped cup into which the spigot is inserted; two loose rings surrounding the spigot, one ring bearing on the inner surface of the cup, and the other ring bearing on the outer surface of the spigot; and a cement filling between the spigot and the cup.

18. In a pipe joint the combination with a spigot ended pipe section, of another pipe section having at its end a cup into which the spigot is inserted; a loose ring surrounding the spigot, the outer circumference of the ring bearing against the inner surface of the material of which the body of the cup and pipes are made, and a protecting coat cementing the ring to the cup applied to the pipes before the joint is made.

19. In a pipe joint consisting of a spigot end of one pipe inserted into the spherical shaped cupped end of another pipe, the combination with the cup and spigot of a loose ring disk surrounding the spigot and a hard cement on one side of the ring filling the space between the cup and spigot and extending from the ring to the mouth of the cup, and a soft cement on the other side extending from the ring to the end of the spigot.

20. In a pipe joint the combination with a spigot ended pipe section, of another pipe section having at its end a cup into which the spigot is inserted; a ring surrounding the spigot, the outer circumference of the ring bearing against the inner surface of the cup; a cement filling between the spigot and cup; and a pour hole in the side of the cup.

21. In a pipe joint consisting of a spigot end of one pipe inserted into the cupped end of another pipe, the combination with the cup and spigot of a hard cement filling between the two extending from the mouth of the cup all round the spigot and partly filling the space toward the end of the spigot, and soft cement filling the balance of the space.

22. The combination of the spigot end S of the pipe P', cup C of the pipe P, hard cement E between the two around the spigot at the mouth end of the cup, and soft cement E' around the spigot at the base of the cup.

23. The combination of the spigot end S of the pipe P', cup C of the pipe P, hard cement E between the two at the mouth end of the cup, soft cement E' at the base of the cup and packing P² for retaining the soft cement when in a fluid state.

24. The combination of the spigot end S of the pipe P', cup C of the pipe P, hard cement E between the two at one end of the cup, soft cement E' at the other end of the cup, and granules G G in the soft cement.

25. In a pipe joint consisting of a spigot end of one pipe inserted into the cupped end of another pipe, the combination with the cup and spigot of a loose sleeve S' surrounding the end of the spigot, soft cement E² surrounding the sleeve, and a key surrounding the spigot to confine the soft cement in the joint.

26. The combination of the spigot S of the pipe P', cup C of the pipe P, loose sleeve S' surrounding the spigot, packing P² under both sleeve and spigot end, and soft cement E² between the sleeve and the spigot.

27. The combination of the spigot S of the pipe P', cup C of the pipe P, loose sleeve S' surrounding the spigot, the sleeve having a bead B round its upper end, the bead having its outer surface convex corresponding with the concave surface of the cup, and ring R surrounding the bead and the cement filling E² surrounding the sleeve.

28. The combination of the spigot S of the pipe P', cup C of the pipe P, loose sleeve S' surrounding the spigot, hard cement E around the mouth of the cup, soft cement E' below the hard cement, and packing P², the sleeve S' extending from the packing P² to the hard cement E.

29. In a pipe joint consisting of a spigot end of one pipe inserted into the cupped end of another pipe the combination with the cup and spigot of a pour hole passing through the side of the cup, a packing for closing the mouth of the cup half rings for pressing the packing against the mouth, and means for bringing the pressure to bear upon the half rings.

30. In a pipe joint the combination with a spigot ended pipe section, of another pipe section having at its end a cup into which the spigot is inserted; a packing ring between the end of the spigot and the base of the cup, and mechanical means for holding the spigot firmly against the packing ring.

31. The combination of the pipe P', spigot S at the end thereof, pipe P and cup C at its end, the spigot S being inserted into the cup C, and a mechanism for holding the spigot and cup together consisting of a half ring $R^4$, embracing cup C, and another half ring $R^5$ embracing the pipe P', cams $C^2$ pivoted to the ends of the half ring $R^5$, one on each side of the pipe, and bolts B' passing through the half rings $R^4$ and $R^5$ and means for straining the cams against the sides of the pipe P'.

32. The combination of the spigot S of the pipe P', cup C of the pipe P, hard cement E between the spigot and cup at the mouth end of the cup, and bituminous cement E' between the spigot and cup at the base end of the cup.

33. The combination of the spigot S of the pipe P', cup C of pipe P, hard cement E surrounding the spigot at mouth of C, soft bituminous cement E' surrounding the spigot at base of C, and hard bituminous cement $E^2$ and $E^3$ lining cup and spigot.

34. The combination of the spigot S of the pipe P', cup C of pipe P, hard cement E between spigot and cup and soft coating $E^3$ and paraffin lining $E^4$ above the coating $E^3$.

35. The combination of the spigot S of the pipe P', cup C of pipe P, hard cement E between spigot and cup, and coating $E^3$ thick enough to cover the irregularities of surface of the pipe castings and form at the same time a matrix in which the cement E is cast and a yielding lubricator permitting of its movement in the cup C.

36. The combination of the spigot S of the pipe P', cup C of pipe P, hard cement E between spigot and cup and soft cement E' below the hard cement, the soft cement being rendered permanently pliable by the admixture with it of a stable fluid.

37. The combination of the spigot S of the pipe P', cup C of pipe P, hard cement E between spigot and cup, and soft cement E' below the hard cement constructed of bituminous cement made pliable by admixture with a mineral oil, and having its melting point raised by the introduction of powdered materials whose melting points are much higher than that of the soft cement 38. In a pipe joint consisting of a spigot end of one pipe inserted into a spherical shaped upper end of another pipe, the combination with the cup and spigot of a loose ring surrounding the spigot, the outer circumference of the ring being equal to the inner circumference of the interior of the cup at its largest point, the ring having a soft cement filling on one side between the disk and the base of the cup and surrounding the spigot.

39. The combination of the spigot S of the pipe P', cup C of the pipe P, ring $R^2$ extending from the interior of the cup at the plane of its largest diameter and surrounding the spigot S and cement between the spigot and the cup.

40. The combination of the spigot S of the pipe P', cup C of the pipe P, ring $R^2$ and hole H through the cup C the hole being partly on one side and partly on the other side of the ring $R^2$ and cement between the spigot and the cup.

41. The combination of the spigot S of the pipe P' cup C of the pipe P, sleeve S' surrounding the spigot S, perforations O in the sleeve and soft cement E'.

42. In a pipe joint consisting of a spigot on the end of one pipe inserted within a cupped end of another pipe, the combination with the spigot and cup of a ring between the two, a space between the ring and the spigot and cup, and a soft material filling this space.

43. In a pipe joint the combination with a spigot-ended pipe section, of another pipe section having an enlarged end into which the spigot is inserted; a ring between the spigot and the enlarged end having its plane substantially at right angles with the axis of the pipes; and a cement filling between the spigot and the enlarged end.

44. In a pipe joint the combination with a spigot ended pipe section, of another pipe section having at its end an enlargement into which the spigot is inserted; a ring surrounding the spigot; cement filling between the spigot and enlargement; and a pour hole in the side of the enlargement, part of the hole being above and part below the ring.

45. In a pipe joint the combination with a spigot ended pipe section, of another pipe section having an enlarged end into which the spigot is inserted; a ring between the spigot and the enlarged end; a pour hole in the side of the hub; and cement filling between the spigot and the hub.

46. In a pipe joint the combination with a spigot ended pipe section of another pipe section having an enlargement into which the spigot is inserted; a ring between the spigot and enlargement, surrounding the spigot; a pour hole in the side of the hub below the ring; and a soft cement filling below the ring.

In testimony whereof I have affixed my signature, in presence of two witnesses.

JOHN PICKERING PUTNAM.

Witnesses:
   Thos. E. Hines,
   Samuel F. Fairfield.